3,660,370
PRODUCTION OF POLYETHYLENE UNDER HIGH PRESSURE WITH METHYL ISOBUTYL KETONE PEROXIDE INITIATOR
Hans Gropper, Ludwigshafen, Kurt Stark, Heidelberg, and Helmut Pfannmueller and Friedrich Urban, Limburgerhof, Germany, assignors to Badische Anilin- & Soda-Fabrik Aktiengesellschaft, Ludwigshafen, Germany
No Drawing. Filed Aug. 17, 1970, Ser. No. 64,649
Claims priority, application Germany, Aug. 28, 1969, P 19 43 698.7
Int. Cl. C08f 3/04, 1/60
U.S. Cl. 260—94.9 R    6 Claims

ABSTRACT OF THE DISCLOSURE

A process for polymerizing ethylene at pressures of more than 1000 atmospheres and at temperatures of from 150° to 400° C. in the presence of methyl isobutyl ketone peroxide. Polyethylene having a density of from 0.924 to 0.935 g./ccm. is obtained in higher yields than in conventional methods; it is used for the production of transparent film and sheeting.

---

The present invention relates to a process for the production of polyethylene by polymerizing ethylene at superatmospheric pressure and elevated temperature in the presence of a specially selected peroxide as a polymerization initiator.

A number of variants of methods of this type is known. A typical characteristic of these methods is that under the conventional conditions a polyethylene having a relatively high density can be prepared only in relatively low yields. Polyethylene having a density of from 0.924 to 0.935 g./ccm., which has been prepared by the high pressure polymerization method, is for example stiffer and more transparent than high pressure polyethylene having a lower density. High pressure polyethylene which has a high density is therefore particularly suitable for the production of transparent sheeting and film having improved stiffness. It has therefore always been a problem to prepare high pressure polyethylene having a high density in conventional plant with a higher conversion. It is known that polymers having a relatively high density can be obtained in better yields by substantially increasing the reaction pressure. This method has the disadvantage however that the polymerization cannot be carried out in conventional equipment. It is on the contrary necessary to use equipment and machinery which meet the requirements of the highest pressure method. Plants using the highest pressure method are however less reliable and more expensive than conventional. Moreover, special safety precautions are necessary in the case of the highest pressure plant.

It is therefore an object of the present invention to provide a process for the polymerization of ethylene under high pressure in which under otherwise conventional reaction conditions a higher yield of polyethylene having a density of from 0.924 to 0.935 g./ccm. is obtained.

We have found that this object is achieved by using methyl isobutyl ketone peroxide in an amount of from 1 to 50 p.p.m. molar (with reference to the ethylene used) as polymerization initiator. In a preferred embodiment of the process, oxygen and methyl isobutyl ketone peroxide in a weight of from 0.1:1 to 5:1 are used as the polymerization initiator. By the combination of the two initiators there is surprisingly obtained a further increase in the yield of polyethylene having a density of from 0.924 to 0.935 g./ccm. It is noteworthy that by using initiators such as methyl ethyl ketone peroxide or cyclohexanone peroxide (which are chemically very similar to methyl isobutyl ketone peroxide) the advantages of the process according to the invention are not achieved.

Methyl isobutyl ketone peroxide is commercially obtainable and is prepared by reaction of methyl isobutyl ketone with hydrogen peroxide (cf. "Ullmanns Enzyklopädie der technischen Chemie," vol. 13, 3rd edition, Munich-Berlin 1962, page 256). A mixture of a number of peroxides is obtained in the said reaction. The most important constituents of the mixture are peroxides having the formulae:

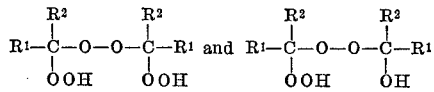

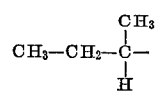

and $R^2$ denotes $CH_3$—.

Methyl isobutyl ketone peroxide is handled in an alkylbenzene, for example dodecylbenzene, for safety reasons.

Polymerization of ethylene is carried out at a pressure of from 1000 to 3500, preferably from 1500 to 3000, atmospheres, continuously or batchwise. It is however also possible to use pressures of more than 3500 atmospheres, but in this case other apparatus is required. Although the yield of polyethylene having a density of from 0.924 to 0.935 g./ccm. is higher at pressures of more than 3500 atmospheres than it is at lower pressures, a further increase in the yield of polyethylene of high density is obtained even in this highest pressure method when methyl isobutyl ketone peroxide is used as catalyst. The reaction temperature is from 150° to 400° C., preferably from 250° to 350°. The polymerization may be carried out in the presence of conventional polymerization modifiers. The amount of polymerization modifier used depends on its strength so that it is not possible to indicate absolute values which are generally applicable. As regards the modifiers reference is made for example to G. A. Mortimer, J. Polymer Sci., A/1,4, 881 to 900 (1966).

Conventional equipment and procedures for carrying out the polymerization of ethylene under high pressure and elevated temperature may be used for carrying out the process according to this invention. In lieu of further explanation, reference is made for example to "Ullmanns Enzyklopädie der technischen Chemie," vol. 14, 3rd edition, Munich-Berlin 1963, Chapter on "Polyethylene," pages 137 to 148, or to Lyle F. Albright, "High-Pressure Processes for Polymerizing Ethylene," Chemical Engineering, vol. 73, Dec. 19 issue, pages 113 to 120 (1966), (these are incorporated as references).

In the following examples the polymerization equipment used is a tubular reactor such as is conventionally used in the continuous polymerization of ethylene at high pressures. The ratio of the diameter of the reaction tube to its length is 1:14,000. The reaction tube is surrounded by a jacket tube for a heat transfer medium. The jacket tube is divided into two zones capable of being operated independently of one another, the first zone extending over two-fifths of the length of the tube (zone I) and the second over three-fifths of the length of the tube (zone II). A valve is provided at the end of the tube and this serves (a) to regulate the pressure in the polymerization zone and (b) to discharge the reaction product. There is arranged downstream of this valve a conventional high pressure separator and a conventional low pressure separator for the resultant polymer from the substances which have not been polymerized, i.e. mainly small amounts of unpolymerized ethylene.

As already stated, high pressure polyethylene having a density of from 0.924 to 0.935 g./ccm., which has been obtained in the process according to this invention with a conversion of 19 to 25%, is particularly suitable for the production of transparent film and sheeting having improved gloss and a low haze value. As compared with prior art methods, polyethylene having the said density range is obtained in yields which are 5 to 8% higher than in prior art methods.

To evaluate the quality of the film or sheeting, the haze value and gloss of the film or sheeting is measured. The production of film from high pressure polyethylene which has been obtained as described in the examples or comparative examples is carried out in a conventional single screw extruder at a temperature of the material of 150° C., a take-up speed of 6.5 meters per minute, a neck length of 250 mm. and an inflation ratio of 1:2. The thickness of the film is 40 microns.

The haze value of the film is measured by allowing a unidirectional beam of light to impinge perpendicularly onto a specimen of the film located in the frame of the measuring equipment and determining the intensity of the light passing through the film. All rays which are scattered at an angle of from 1.25° to 90° are measured in this arrangement. In the first measurement, the sample is placed immediately in front of the aperture of the measuring equipment for the first measurement and at a distance of 700 mm. from the aperture for the second measurement. The difference between the two measured values is the amount of haze in percent. This method is substantially the same as that described in ASTM D–1003–61, but the measured values are not directly comparable.

The gloss of the film is measured by allowing a unidirectional beam of light to impinge on a planar section of the film and measuring the reflected light by means of a photocell. The angle of incidence and the angle of reflection are 45° in this arrangement. A sheet of polished black glass having 5% specular reflection is used as gloss standard for calibration, the recording instrument being adjusted to 100 scale units. For the measurement, a box lined with black velvet across the opening of which the test specimen of film is arranged is used as light trap. The gloss is given in units with reference to the gloss of the sheet of black glass. This method is substantially the same as that described in ASTM D–2457–65 T, but the measured values are not directly comparable.

The following examples illustrate the invention. The parts given in the example are parts by weight.

EXAMPLE 1

The reactor is continuously charged per hour under a pressure of 2,400 atmospheres with a mixture consisting of 1,000,000 parts of ethylene, 64 parts of methyl isobutyl ketone peroxide (equivalent to 6.7 molar p.p.m. with reference to ethylene) and 12,000 parts of acetone (modifier). The heat transfer medium is kept at a constant temperature of 183° C. in zone (II). The reaction mixture reaches a temperature of 315° C. as a result of the heat liberated.

232,000 parts of polyethylene per hour is thus obtained which according to ASTM D–1238 has a melt index of 3.7 g./ten minutes and a density according to DIN 53479/7.2 of 0.9305 g./ccm. Film is prepared from this polymer as described above. The gloss of the film is 127 units and the haze value is 12%.

Comparative example

The above procedure is followed exactly except that 58 parts of methyl ethyl ketone peroxide per hour (equivalent to about 7.7 molar p.p.m. with reference to the ethylene used) is used instead of the methyl isobutyl ketone peroxide. 181,000 parts of polyethylene per hour is obtained which has a melt index of 4.1 g./ten minutes and a density of 0.9276 g./ccm. A haze value of 22% and a gloss of 88 units is ascertained for film made from this polymer.

EXAMPLE 2

The reactor is charged per hour under a pressure of 2,700 atmospheres with a mixture consisting of 1,000,000 parts ethylene, 40 parts of methyl isobutyl ketone peroxide (equivalent to about 4.2 molar p.p.m.) and 5,500 parts by weight of methyl ethyl ketone. Constant temperatures of 189° C. and 197° C. respectively are maintained in zones (I) and (II) of the reactor jacket. The reaction mixture reaches a temperature of 302° C. as a result of the heat liberated. 190,000 parts of polyethylene per hour is obtained which has a melt index of 0.28 g./ten minutes and a density of 0.9293 g./ccm. Film prepared from this polymer has a gloss of 60 units and a haze value of 38%.

Comparative experiment

The procedure described above is followed exactly except that 42 parts of cyclohexanone peroxide per hour (equivalent to about 4.8 molar p.p.m.) is used as initiator instead of methyl isobutyl ketone peroxide. 122,000 parts of polyethylene per hour is obtained which has a melt index of 0.30 g./ten minutes and a density of 0.9268 g./ccm. Film prepared from this polymer by the method described above has a haze value of 75% and a gloss of 25 units.

EXAMPLE 3

The reactor is charged per hour under a pressure of 2,700 atmospheres with a mixture consisting of 1,000,000 parts of ethyl, 32 parts of methyl isobutyl ketone peroxide (equivalent to 3.4 molar p.p.m.), 32 parts by weight of oxygen (equivalent to 8.8 molar p.p.m.), and 6000 parts by weight of methyl ethyl ketone. The heat transfer medium is kept at a constant temperature of 190° C. in zone (I) of the reactor jacket and at 195° C. in zone (II). The reaction material reaches a temperature of 305° C. as a result of the heat liberated. 208,000 parts of polyethylene per hour is obtained whose characteristic data are: melt index 0.35 g./ten minutes; density 0.9295 g./cm.$^3$. Film of this material has a haze value of 34% and a gloss of 70 units.

Comparative experiment

The procedure described above is followed except that oxygen is used as initiator instead of the mixture of methyl isobutyl ketone peroxide and oxygen. 20 parts of oxygen per hour (equivalent to about 17.7 molar p.p.m.) is supplied to the reactor. About 135,000 parts of polyethylene per hour is obtained which has a melt index of 0.32 and a density of 0.9268 g./ccm. Film prepared from this material has a haze value of 42% and a gloss of 45 units.

We claim:

1. In a process for the polymerization of ethylene at pressures of more than 1000 atmospheres and at temperatures of from 150° to 400° C. in the presence of a polymerization initiator the improvement which comprises polymerizing ethylene in the presence of methyl isobutyl ketone peroxide as the essential polymerization initiator in an amount of from 1 to 50 molar p.p.m. with reference to ethylene.

2. A process as claimed in claim 1 wherein the polymerization initiator consists essentially of a mixture of oxygen and methyl isobutyl ketone peroxide in a weight ratio of from 0.1:1 to 5:1.

3. A process as claimed in claim 1 carried out at a pressure of from 1000 to 3500 atmospheres.

4. A process as claimed in claim 1 carried out in the presence of a polymerization modifier.

5. A process as claimed in claim 4 wherein said modifier is acetone or methyl ethyl ketone.

6. A process as claimed in claim 1 carried out continuously at said pressures and temperatures and for a period of time sufficient to provide a polymer product consisting essentially of polyethylene having a density of from 0.924 to 0.935 g./ccm.

References Cited

UNITED STATES PATENTS

| | | | |
|---|---|---|---|
| 3,334,081 | 8/1967 | Madgwick et al. | 260—94.9 R |
| 2,762,791 | 9/1956 | Pease et al. | 260—94.9 R |

JOSEPH L. SCHOFER, Primary Examiner

A. HOLLER, Assistant Examiner